W. F. COCHRANE.
GRAIN THRESHER AND SEPARATOR.
No. 37,131.                                    Patented Dec. 9, 1862.
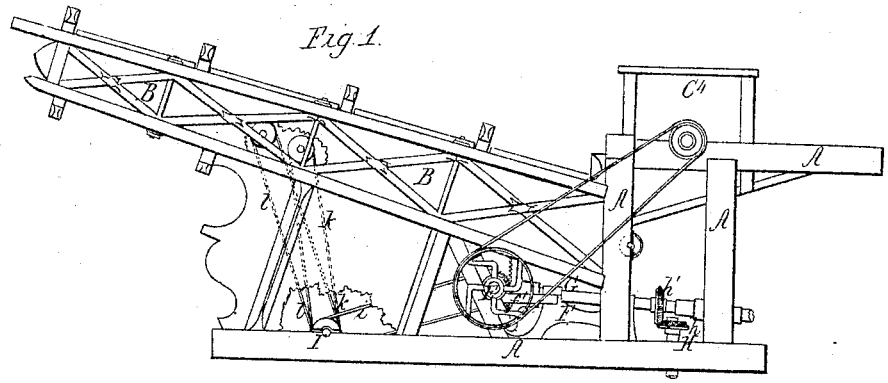
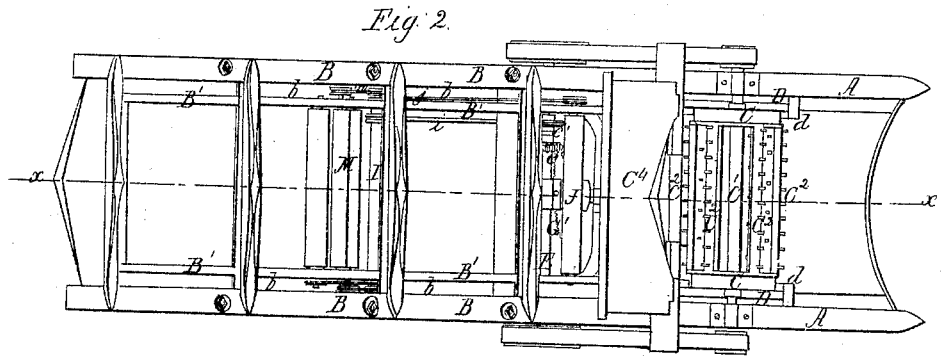
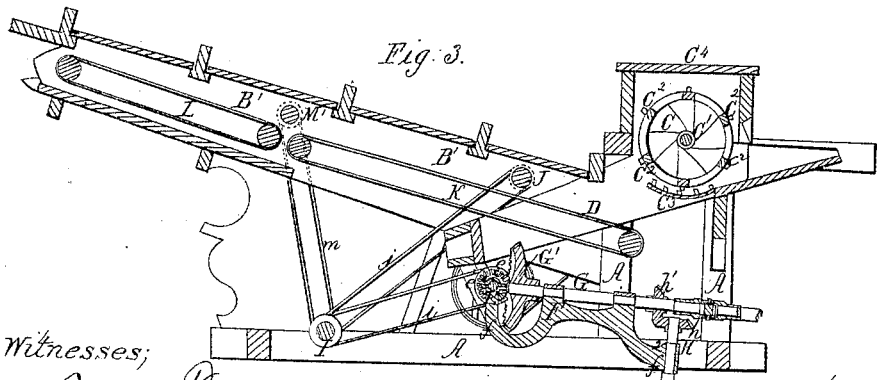
Witnesses;
Inventor;

UNITED STATES PATENT OFFICE.

WILLIAM F. COCHRANE, OF SPRINGFIELD, OHIO, ASSIGNOR TO HIMSELF AND WARDER & CHILD, OF SAME PLACE.

IMPROVEMENT IN GRAIN THRASHERS AND SEPARATORS.

Specification forming part of Letters Patent No. 37,131, dated December 9, 1862.

*To all whom it may concern:*

Be it known that I, WILLIAM F. COCHRANE, of Springfield, in the county of Clarke, and State of Ohio, have invented certain new and useful Improvements in Machinery for Thrashing and Separating Grain, of which the following is a full, clear, and exact description of the same, reference being had to the accompanying drawings, which make part of this specification, and in which—

Figure 1 represents a view in elevation of one side of a machine for thrashing and separating grain embracing my improvements, a portion of the frame-work being broken away to show the mechanism within. Fig. 2 represents a plan or top view of the same, with the grain-belt, straw-carrier, and covering removed, and the casing of the cylinder thrown back upon its hinges. Fig. 3 represents a vertical longitudinal section through the same at the line $x$ $x$ of Fig. 2 with the covering-belts and casing in position.

The improvements claimed under this patent consist, first, in forming an independent frame inside the grain-belt frame, as hereinafter described, thereby providing a space between them in which to locate the driving-pulleys and winnowing-spouts; second, in combination with the double frame above described, driving the grain belt, straw-carrier, beater, and picker from the conveyer-shaft, whereby their driving bands are kept inside the framing.

In the accompanying drawings, which represent a convenient arrangement of parts for carrying out the objects of my invention, the mechanism is shown as mounted in a stout frame, A. Inside of the grain-belt frame B a smaller frame or trough, B', is arranged, as shown in Figs. 2 and 3 of the drawings, so that a space, $b$, is left between the two on each side. It will be observed that rollers of the grain-belt and straw-carrier, the beater-shaft and the picker, all turn in bearings in the inside trough, B', through which their ends project, and are provided with pulleys, by which to rotate them, as hereinafter more fully shown. The winnowing-spouts D are also arranged within this space. (See Fig. 3.) A shaft, I, is mounted in the frame near its rear end, and may serve as a conveyer-shaft. It is driven by a cord, $i$, encircling a pulley, $e'$, on the countershaft E. The beater J is driven in a similar manner from the conveyer-shaft by a cord, $j$, the grain belt K by a cord, $k$, the straw-carrier L by a cord, $l$, and the picker-shaft M by a cord, $m$. By this arrangement all the mechanism, except the cylinder, is driven from the conveyer-shaft, while the belts and pulleys are kept inside the frame-work, where they are protected from the weather. The machine is likewise to be provided with a suitable shaking-shoe or riddle.

It is deemed unnecessary here to describe in detail the construction and operation of the other parts of the mechanism, as they form no part of the subject-matter herein claimed, and, besides, are fully described in two other applications filed simultaneously with this, and marked, respectively, Division F and H.

What I claim under this patent as my invention is—

1. Constructing an independent frame or trough inside the grain-belt frame, substantially in the manner described, so as to form a space in which to locate the driving-pulleys, &c.

2. In combination with an independent frame, driving the grain-belt, straw-carrier, beater, and picker from the conveyer-shaft, substantially in the manner and for the purpose described.

In testimony whereof I have hereunto subscribed my name.

WILLIAM F. COCHRANE.

Witnesses:
WM. WARDER,
JOHN H. WARDER.